(12) United States Patent  (10) Patent No.: US 8,998,310 B2
Lovasz et al.  (45) Date of Patent: Apr. 7, 2015

(54) SEAT TRIM RETENTION CLIP

(75) Inventors: Eric Lovasz, Southgate, MI (US); Paul S. Severinski, Brownstown, MI (US); Louella Ann Patterson, Goodells, MI (US)

(73) Assignee: Lear Corporation, Southfield, MI (US)

( * ) Notice: Subject to any disclaimer, the term of this patent is extended or adjusted under 35 U.S.C. 154(b) by 53 days.

(21) Appl. No.: 13/606,201

(22) Filed: Sep. 7, 2012

(65) Prior Publication Data

US 2014/0068900 A1  Mar. 13, 2014

(51) Int. Cl.
*A47C 7/02* (2006.01)
*A47C 31/02* (2006.01)
*B68G 7/12* (2006.01)
*B60N 2/58* (2006.01)
*F16B 5/06* (2006.01)
*F16B 21/07* (2006.01)

(52) U.S. Cl.
CPC .......... *A47C 31/023* (2013.01); *Y10T 24/44752* (2013.01); *B68G 7/12* (2013.01); *B60N 2/5825* (2013.01); *F16B 5/0692* (2013.01); *F16B 21/071* (2013.01)

(58) Field of Classification Search
CPC .. B60N 2/5825; A47C 31/023; F16B 5/0692; F16B 21/071; Y10T 24/309; Y10T 24/44017; Y10T 24/44752
USPC ........ 297/452.6; 24/292; 248/346.1, 519, 678
See application file for complete search history.

(56) References Cited

U.S. PATENT DOCUMENTS

| | | | |
|---|---|---|---|
| 3,019,498 A | 2/1962 | Brown | |
| 3,132,727 A * | 5/1964 | Meulenberg et al. | 52/718.07 |
| 3,630,572 A | 12/1971 | Homier | |
| 3,848,926 A | 11/1974 | Kuroishi | |
| 3,961,823 A | 6/1976 | Caudill, Jr. | |
| 4,470,179 A | 9/1984 | Gollin et al. | |
| 4,508,220 A | 4/1985 | Pearson | |
| 4,999,019 A * | 3/1991 | Kraus | 411/512 |
| 5,320,269 A | 6/1994 | Deschenes et al. | |
| 5,388,749 A | 2/1995 | Davignon et al. | |
| 5,548,929 A | 8/1996 | Larsen et al. | |
| 5,605,373 A | 2/1997 | Wildern, IV et al. | |
| 5,641,552 A | 6/1997 | Tillner | |
| 5,683,025 A | 11/1997 | Grendol | |
| 5,733,001 A | 3/1998 | Roberts | |
| 5,820,213 A * | 10/1998 | Severinski | 297/218.5 |
| 5,896,720 A | 4/1999 | Bond | |
| 5,964,017 A | 10/1999 | Roberts | |
| 5,971,478 A | 10/1999 | Hurite | |
| 6,299,255 B1 | 10/2001 | Pichon | |
| 6,431,585 B1 * | 8/2002 | Rickabus et al. | 280/728.3 |
| 6,478,209 B1 | 11/2002 | Bruins et al. | |
| 6,568,761 B2 | 5/2003 | Perske et al. | |
| 6,668,429 B2 | 12/2003 | Fujisawa et al. | |
| 6,698,641 B2 | 3/2004 | Flannery et al. | |

(Continued)

FOREIGN PATENT DOCUMENTS

DE  7317520 U  3/1974
DE  69310593 T2  12/1997

(Continued)

*Primary Examiner* — Jeanette E Chapman
(74) *Attorney, Agent, or Firm* — Brooks Kushman P.C.

(57) ABSTRACT

A seat trim retention clip that may have a pad and at least one footing. The pad may have first and second retention features. A footing may extend from the pad and may have a plurality of arms that extend from the pad.

11 Claims, 6 Drawing Sheets

(56) References Cited

U.S. PATENT DOCUMENTS

| | | |
|---|---|---|
| 6,899,399 B2 | 5/2005 | Ali et al. |
| 6,964,453 B1 | 11/2005 | Flegal et al. |
| 7,021,598 B2 * | 4/2006 | Kao ............................. 248/521 |
| 7,114,221 B2 | 10/2006 | Gibbons et al. |
| 7,287,305 B2 | 10/2007 | Bednarski |
| 7,487,575 B2 | 2/2009 | Smith |
| 7,517,577 B2 | 4/2009 | Pedde et al. |
| 7,559,100 B2 | 7/2009 | Pedde et al. |
| 7,585,025 B2 | 9/2009 | Welch et al. |
| 7,815,992 B2 | 10/2010 | Pedde et al. |
| 7,946,649 B2 * | 5/2011 | Galbreath et al. ......... 297/218.1 |
| 8,046,879 B2 * | 11/2011 | Werner et al. .................. 24/297 |
| 8,099,837 B2 | 1/2012 | Santin et al. |
| 8,113,539 B2 * | 2/2012 | Paruszkiewicz et al. .. 280/728.3 |
| 8,191,971 B2 | 6/2012 | Lovasz |
| 8,197,010 B2 * | 6/2012 | Galbreath et al. ......... 297/452.6 |
| 8,695,177 B2 * | 4/2014 | Kato et al. ..................... 24/297 |
| 8,783,768 B2 * | 7/2014 | Severinski et al. |
| 8,814,267 B2 * | 8/2014 | Welch et al. ............... 297/218.4 |
| 2002/0101109 A1 | 8/2002 | Stiller et al. |
| 2003/0215601 A1 | 11/2003 | Pedde et al. |
| 2005/0006944 A1 | 1/2005 | Ali et al. |
| 2005/0150090 A1 | 7/2005 | Pedde et al. |
| 2008/0048474 A1 | 2/2008 | Pedde et al. |
| 2008/0258523 A1 | 10/2008 | Santin et al. |
| 2009/0085384 A1 | 4/2009 | Galbreath et al. |
| 2009/0096274 A1 | 4/2009 | Pedde et al. |
| 2009/0295215 A1 | 12/2009 | Galbreath et al. |
| 2010/0117434 A1 * | 5/2010 | Galbreath et al. ....... 297/452.58 |
| 2011/0197405 A1 * | 8/2011 | Kato et al. ..................... 24/530 |
| 2011/0227390 A1 | 9/2011 | Lovasz |

FOREIGN PATENT DOCUMENTS

| | | |
|---|---|---|
| DE | 29821697 U1 | 2/1999 |
| DE | 29822649 U1 | 4/1999 |
| DE | 20100848 U1 | 3/2001 |
| DE | 10019798 A1 | 11/2001 |
| DE | 202004017050 U1 | 1/2005 |
| DE | 202005008952 U1 | 8/2005 |
| DE | 202005013339 U1 | 11/2005 |
| DE | 102006020306 A1 | 11/2007 |
| DE | 102007037867 A1 | 6/2008 |
| DE | 102009046551 A1 | 5/2010 |
| EP | 1220628 A1 | 7/2002 |
| GB | 2328708 A | 3/1999 |
| JP | 2691457 B2 | 12/1997 |
| WO | 02054917 A2 | 7/2002 |
| WO | 2008017360 A1 | 2/2008 |

* cited by examiner

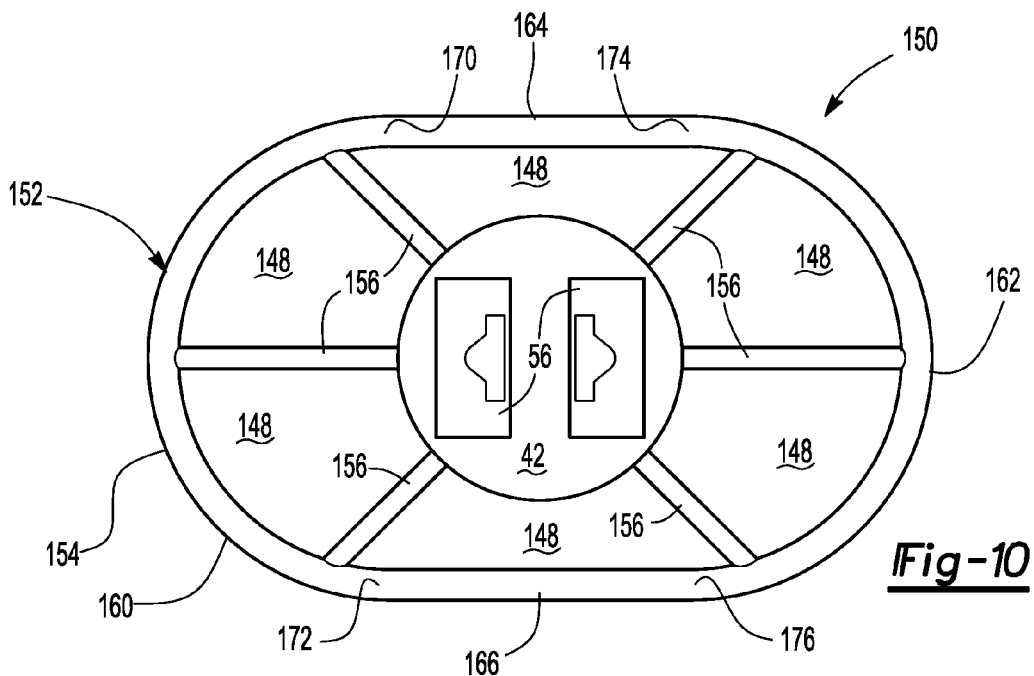
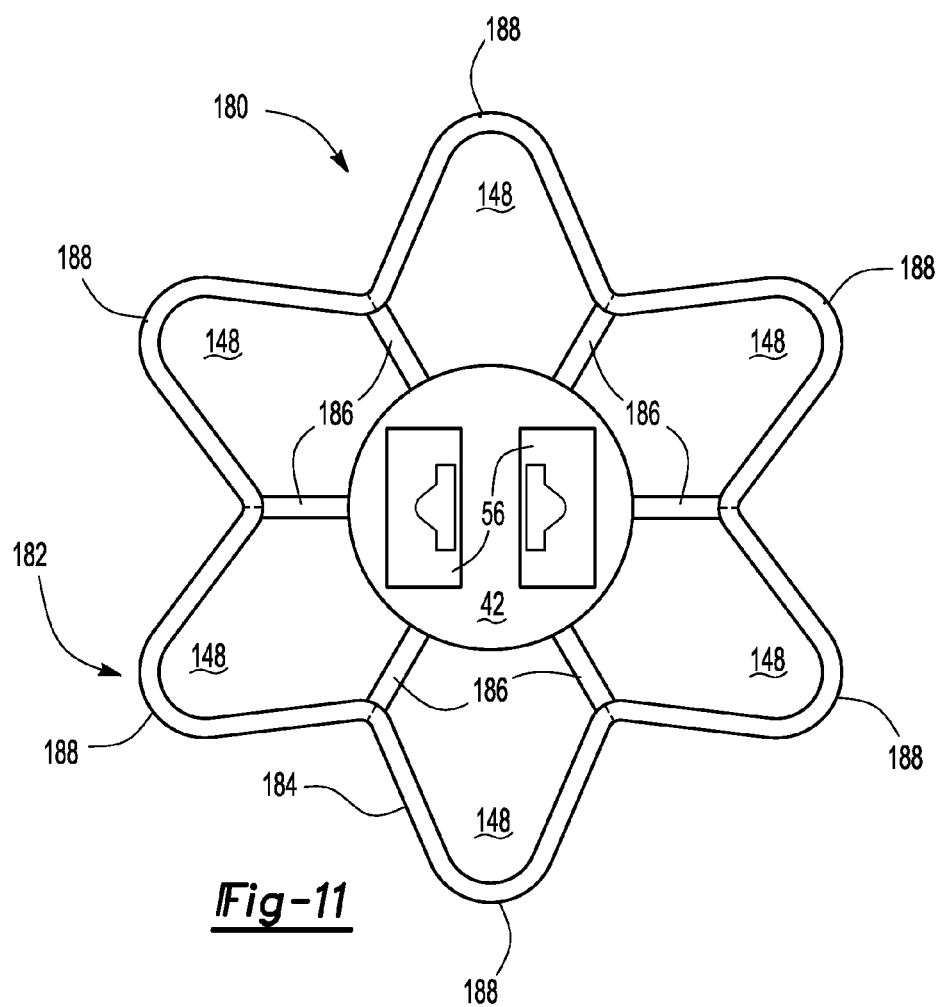

SEAT TRIM RETENTION CLIP

TECHNICAL FIELD

This application relates to a seat trim retention clip that may secure a trim cover.

BACKGROUND

A retention clip is disclosed in U.S. Pat. No. 8,191,971.

SUMMARY

In at least one embodiment, a seat trim retention clip is provided. The seat trim retention clip may include a pad and first and second footings. The pad may have first and second retention features. The first and second footings may be spaced apart from each other and may include a first arm, a second arm, and an arcuate arm. The first and second arms may extend from the pad. The arcuate arm may extend along an arc from an end of the first arm to an end of the second arm.

In at least one embodiment, a seat trim retention clip is provided. The seat trim retention clip may include a pad, a first footing, a second footing, and a ring member. The pad may have first and second retention features that may be configured to engage a trim cover assembly. The first and second footings may be spaced apart from each other. The first and second footings may each include a first arm, a second arm, and an arcuate arm. The first and second arms may extend from the pad. The arcuate arm may be spaced apart from the pad and may extend along an arc from an end of the first arm to an end of the second arm. The ring member may be spaced apart from the pad and may extend completely around the pad. The ring member may intersect the first and second footings.

In at least one embodiment, a seat trim retention clip is provided. The seat trim retention clip may include a pad and a footing. The pad may have first and second retention features that extend from the pad. The footing may include a ring member and a set of arms. The ring member may be spaced apart from the pad and may extend completely around the pad. Members of the set of arms may be spaced apart from each other and may extend from the pad to the ring member.

BRIEF DESCRIPTION OF THE DRAWINGS

FIGS. 5-11 are perspective views of various retention clips.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
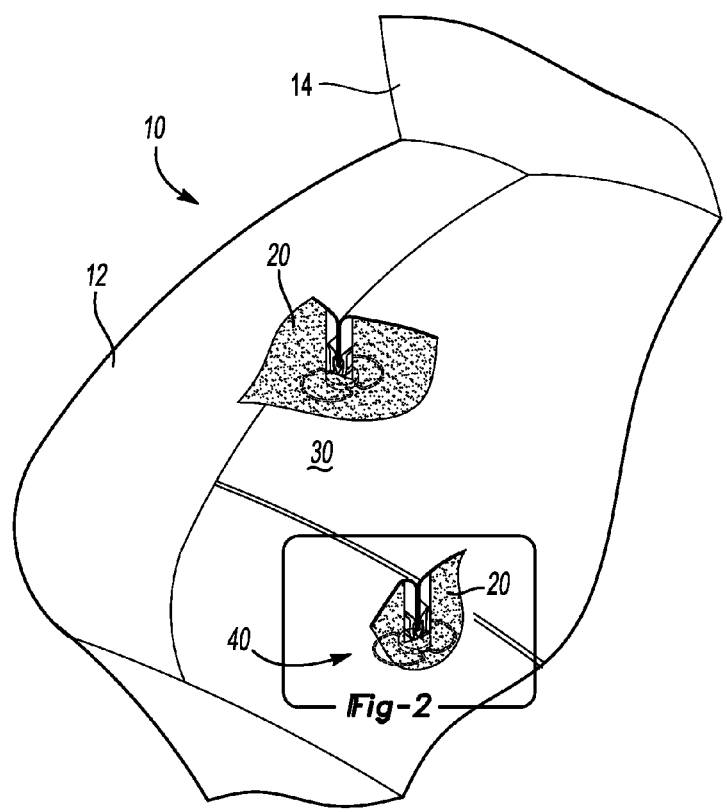
FIG. 1 is a fragmentary perspective view of a portion of a seat assembly.
Figure 2:
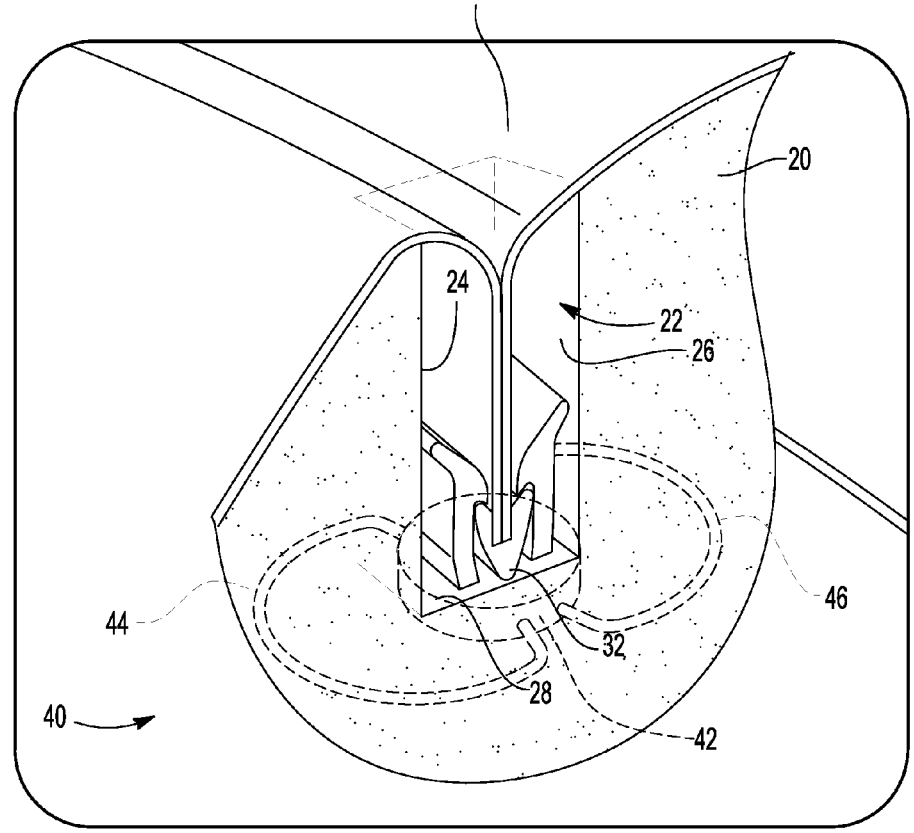
FIG. 2 is a magnified section view of the seat assembly having a trim cover assembly and a retention clip.

Referring to FIGS. 1 and 2, a portion of a seat assembly 10 is shown. The seat assembly 10 may be configured for use in a vehicle, such as a car or truck. In addition, the seat assembly 10 may be configured for non-vehicular applications.

The seat assembly 10 may include a seat bottom 12 and a seat back 14. The seat bottom 12 and the seat back 14 may include a support structure, such as a seat frame, seat pan, and/or support wires such as a suspension mat.

A cushion 20 may supported by the support structure. The cushion 20 may be made of any suitable material, such as foam. The cushion 20 may include at least one opening 22. The opening 22 may be a recess, such as a hole, trench, or elongated channel, that may be provided in the cushion 20. The opening 22 may be at least partially defined by a plurality of surfaces. For instance, the opening 22 may be at least partially defined by a first side surface 24, a second side surface 26, and a third side surface 28. The first side surface 24 may be disposed opposite the second side surface 26. The third side surface 28 may extend between the first and second side surfaces 24, 26 as is best shown in FIG. 2.

At least one trim cover assembly 30 may be provided with the seat assembly 10. The trim cover assembly 30 may be disposed over the cushion 20 and may be an exterior surface of the seat assembly 10 upon which a seat occupant may be disposed when in a seated position. The trim cover assembly 30 may include one or more trim panels that may be made of any suitable material, such as fabric, leather, vinyl, or combinations thereof.

The trim cover assembly 30 may include an engagement feature 32. The engagement feature 32 may help secure the trim cover assembly 30 to the seat assembly 10, may hold the trim cover assembly 30 in a desired position, and may inhibit folding, puckering, or wrinkling of the trim cover assembly 30 that may result in an undesirable aesthetic appearance. The engagement feature 32 may have any suitable configuration, such as a male configuration, female configuration, or combinations thereof. In addition, the engagement feature 32 may be provided in any suitable location. For example, the engagement feature 32 may be provided proximate an end of one or more trim cover panels. The engagement feature 32 may be coupled to the trim cover assembly 30 in any suitable manner, such as with stitching or an adhesive. Moreover, the engagement feature 32 may be made of any suitable material, such as a polymeric material.

Figure 3:
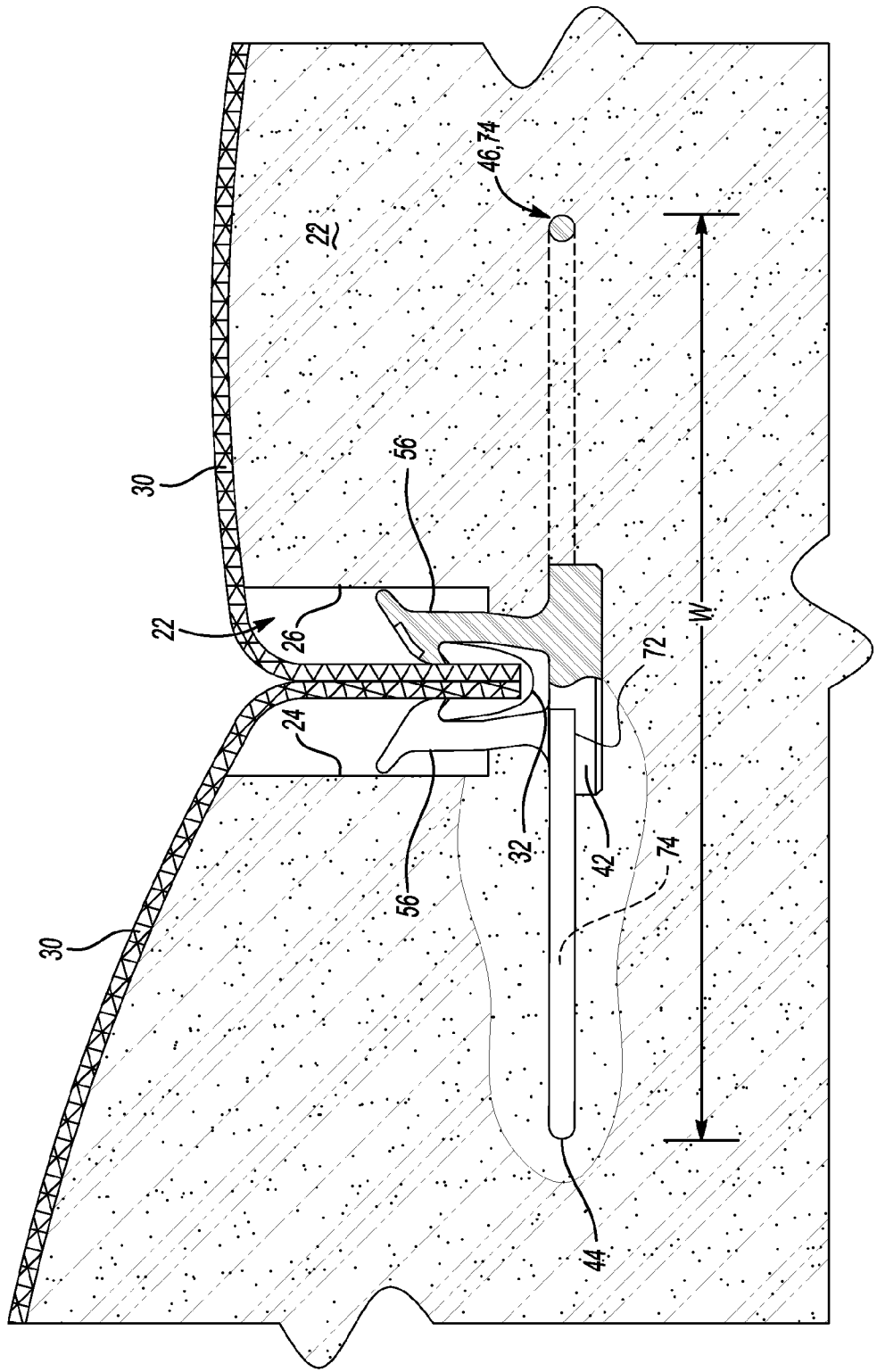
FIG. 3 is a partial side section view of the seat assembly and the retention clip shown in FIG. 2.
Figure 4:
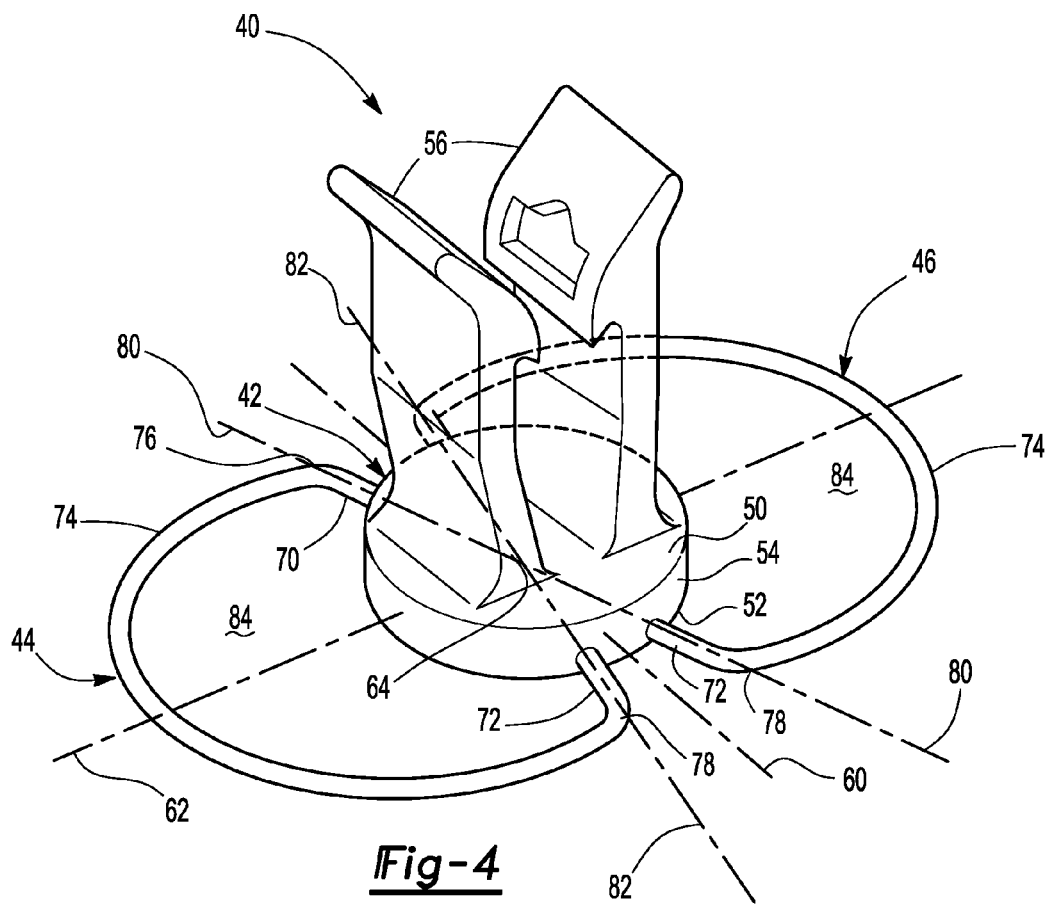
FIG. 4 is a perspective view of the retention clip shown in FIG. 2.

Referring to FIGS. 2-4, the seat assembly 10 may also include a retention clip 40. The retention clip 40 may be configured to engage one or more engagement features 32 to provide localized retention of the trim cover assembly 30. The retention clip 40 may engage the cushion 20 and may be partially disposed in the opening 22 as will be discussed in more detail below. In at least one embodiment, the retention clip 40 may include a pad 42, a first footing 44 and a second footing 46.

The pad 42 may be disposed proximate a center of the retention clip 40. In the embodiment shown, the pad 42 is configured as a generally circular disk, although other geometries are contemplated. The pad 42 may include a first pad surface 50, a second pad surface 52, a third pad surface 54, and one or more retention features 56. The first pad surface 50 may be disposed opposite the second pad surface 52. The third pad surface 54 may extend from the first pad surface 50 to the second pad surface 52.

The first and second axes 60, 62 may extend through the pad 42. The first and second axes 60, 62 may be provided in a coplanar perpendicular relationship and may intersect at substantially the center 64 or along a center axis of the pad 42. As such, the first and second axes 60, 62 may substantially bisect the pad 42 in one or more embodiments.

One or more retention features 56 may be configured to engage the trim cover assembly 30. For example, the retention features 56 may extend through the cushion 20 and may be disposed in the opening 22 to engage the engagement feature 32. The retention features 56 may have any suitable configuration. In the embodiment shown, two retention features 56 are provided that extend from the first pad surface 50 and are configured as a pair of barbs. The retention features 56 may be spaced apart from each other and may be spaced apart from and disposed on opposite sides of the first axis 60. The retention features 56 may be configured to flex away from each other to receive the engagement feature 32 in a snap-fit arrangement.

The first and second footings 44, 46 may engage the cushion 20 and provide sufficient surface area to anchor or inhibit removal of the retention clip 40. In at least one embodiment, the first and second footings 44, 46 may be disposed within the cushion 20. For example, a retention clip 40 may be positioned in a mold and the cushion material may be injected, molded, and cured around the first and second footings 44, 46 to secure the retention clip 40 in a predetermined location in the cushion 20. Alternatively, the first and/or second footings 44, 46 may be disposed underneath or along a surface of the cushion 20 without being disposed inside the cushion 20. In either case, the first and second footings 44, 46 may distribute load forces and inhibit the retention clip 40 from being removed or disconnected from the cushion 20. As is best shown in FIG. 3, the first and second footings 44, 46 may cooperate with the pad 42 to provide a width W that is greater than the width or distance between the first and second side surfaces 24, 26 of the opening 22.

Referring to FIG. 4, the first and second footings 44, 46 may be configured as mirror images of each other. The first and second footings 44, 46 and may be disposed on opposite sides of the first axis 60 and may be spaced apart from the first axis 60. In addition, the first and second footings 44, 46 may be spaced apart from each other to permit the first and second footings 44, 46 to independently flex. The first and second footings 44, 46 may be integrally formed with the pad 42. In addition, the pad 42 and first and second footings 44, 46 may be coplanar or disposed in a common plane with the first and second axes 60, 62. In at least one embodiment, the first and second footings 44, 46 may each include a first arm 70, a second arm 72, and an arcuate arm 74.

The first and second arms 70, 72 may extend from the pad 42 and may be spaced apart from each other. The first arm may have an end 76. The second arm 72 may have an end 78. In at least one embodiment, the first and second arms 70, 72 may be substantially linear and may extend along first and second arm axes 80, 82, respectively. In at least one embodiment, the first and second arm axes 80, 82 intersect at the center 64 of the pad 42 and may be coplanar with the first and second axes 60, 62. In addition, the first and second arm axes 80, 82 may extend at an acute angle with respect to the first axis 60 in one or more embodiments. The first arm 70 of the first footing 44 and the second arm 72 of the second footing 46 may be disposed along the first arm axis 80 and the first arm 70 of the second footing 46 and the second arm 72 of the first footing 44 may be disposed along the second arm axis 82.

The arcuate arm 74 may extend along an arc from the end 76 of the first arm 70 to the end 78 of the second arm 72. In at least one embodiment, the arc may have a constant radius of curvature. The arcuate arm 74 may be bisected by the second axis 62. In addition, the arcuate arm 74 may be spaced apart from the pad 42. As such, the arcuate arm 74 may cooperate with the pad 42, first arm 70, and second arm 72 to at least partially define a footing opening 84 that may provide access for insertion of a tool through the retention clip 40 to engage and pull the trim cover assembly 30 toward and into engagement with the retention clip 40.

Figure 5:
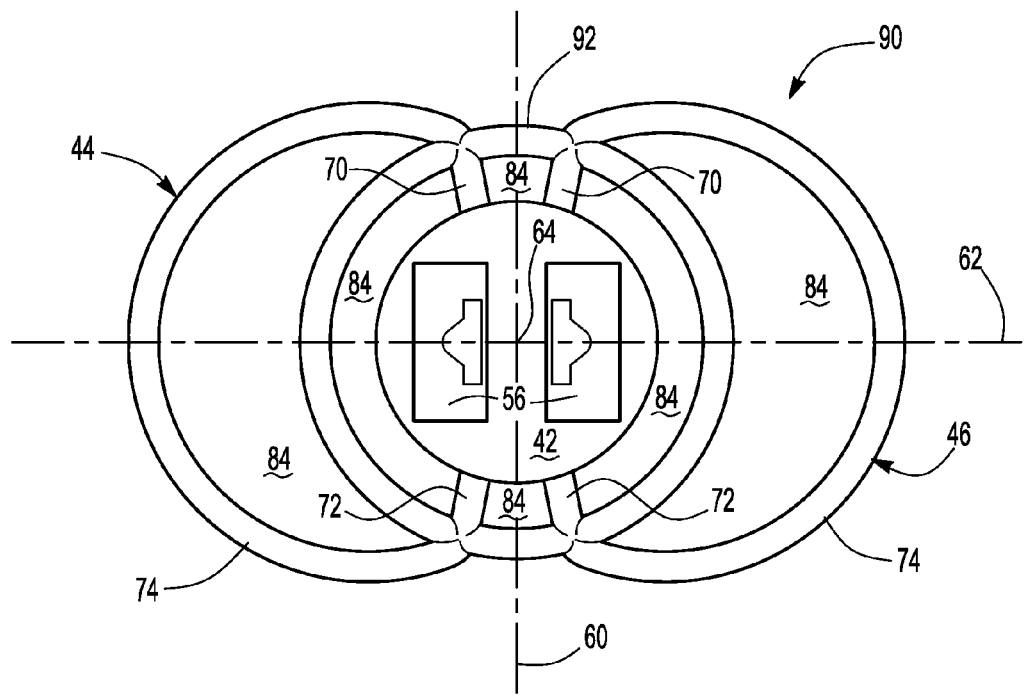

Referring to FIG. 5, second embodiment of a retention clip 90 is shown. In this embodiment, a ring member 92 is added to the embodiment shown in FIG. 4. The ring member 92 may be spaced apart from the pad 42 and may extend completely around the pad 42. The ring member 92 may intersect the first and second footings 44, 46. In at least one embodiment, the ring member 92 may intersect the first and second arms 70, 72 of the first and second footings 44, 46. The ring member 92 may be circular and may be radially disposed with respect to the center 64 of the pad 42 in one or more embodiments. In addition, a plurality of footing openings 84 may be provided between the ring member 92 and the pad 42 and a footing opening 84 may be provided between the ring member 92 and each arcuate arm 74.

Figure 6:
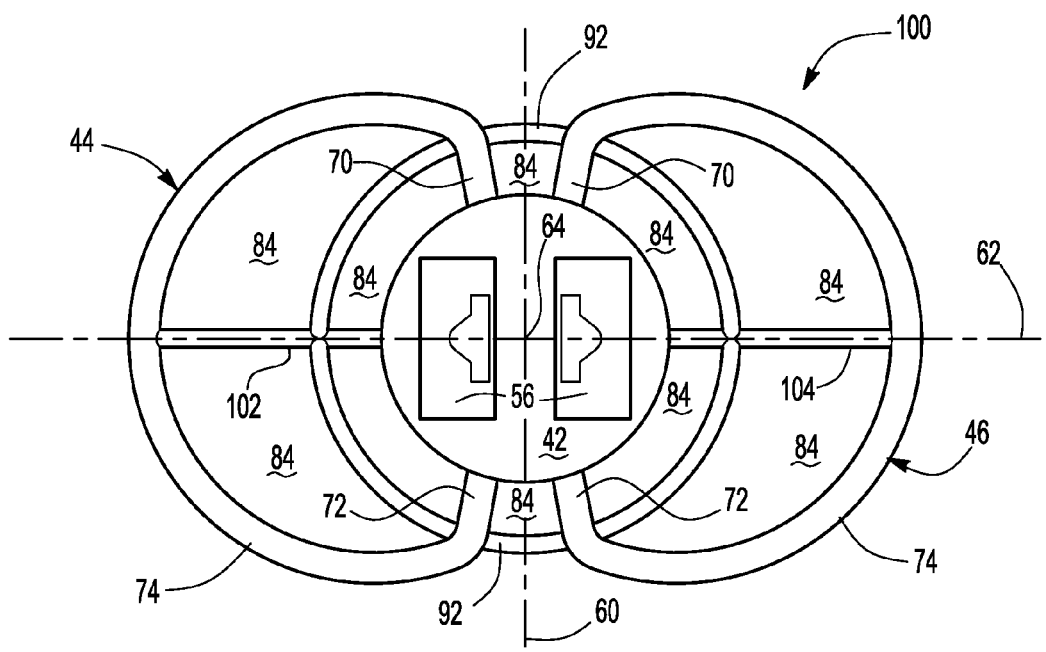

Referring to FIG. 6, a third embodiment of a retention clip 100 is shown. In this embodiment, a first axial arm 102 and a second axial arm 104 are added to the retention clip 100 shown in FIG. 5. The first and second axial arms 102, 104 may be substantially linear and may be coaxially disposed with the second axis 62 in one or more embodiments. The first and second axial arms 102, 104 may extend in opposite directions from the pad 42. The first axial arm 102 may intersect the ring member 92 of the first footing 44. The second axial arm 104 may intersect the ring member 92 the second footing 46. In addition, the first axial arm 102 may intersect and may bisect the arcuate arm 74 of the first footing 44 while the second axial arm 104 may intersect and may bisect the arcuate arm 74 of the second footing 46. Footing openings 84 may be at least partially defined by the first and second axial arms 102, 104.

Figure 7:
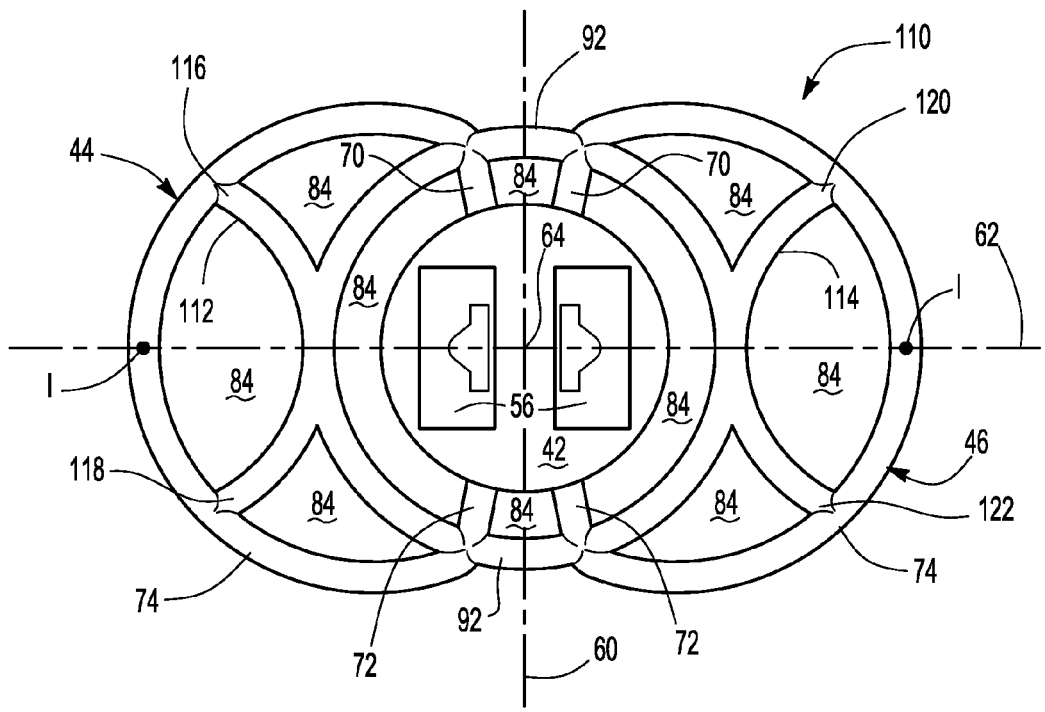

Referring to FIG. 7, a fourth embodiment of a retention clip 110 is shown. In this embodiment, a first curved arm 112 and a second curved arm 114 are added to the embodiment shown in FIG. 5. The first and second curved arms 112, 114 may have a constant radius of curvature in one or more embodiments. A constant radius of curvature may extend from the intersection (I) between the arcuate arm 74 and the second axis 62.

The first curved arm 112 may have a first curved arm end 116 and a second curved arm end 118 disposed opposite the first curved arm end 116. The first and second curved arm ends 116, 118 may intersect the arcuate arm 74 of the first footing 44. The first curved arm 112 may also intersect the ring member 92 between the first and second curved arm ends 116, 118, such as proximate the second axis 62.

The second curved arm 114 may also have a first curved arm end 120 and a second curved arm end 122 disposed opposite the first curved arm end 120. The first and second curved arm ends 120, 122 may intersect the arcuate arm 74 of the second footing 46. The second curved arm 114 may also intersect the ring member 92 between the first and second curved arm ends 120, 122, such as proximate the second axis 62. Footing openings 84 may be at least partially defined by the first and second curved arms 112, 114.

Figure 8:
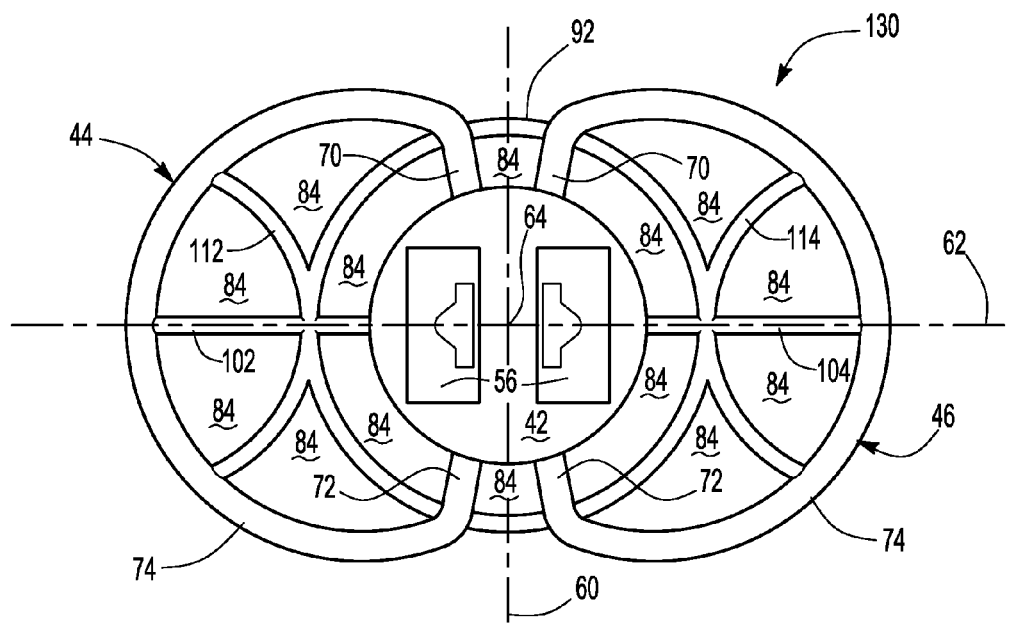

Referring to FIG. 8, a fifth embodiment of a retention clip 130 is shown. In this embodiment, first and second axial arms 102, 104 are added to the embodiment shown in FIG. 7. The first axial arm 102 may intersect the ring member 92, first curved arm 112, and the arcuate arm 74 of the first footing 44. The second axial arm 104 may intersect the ring member 92, second curved arm 114, and the arcuate arm 74 of the second footing 46. Footing openings 84 may be at least partially defined by the first and second axial arms 102, 104.

Figure 9:
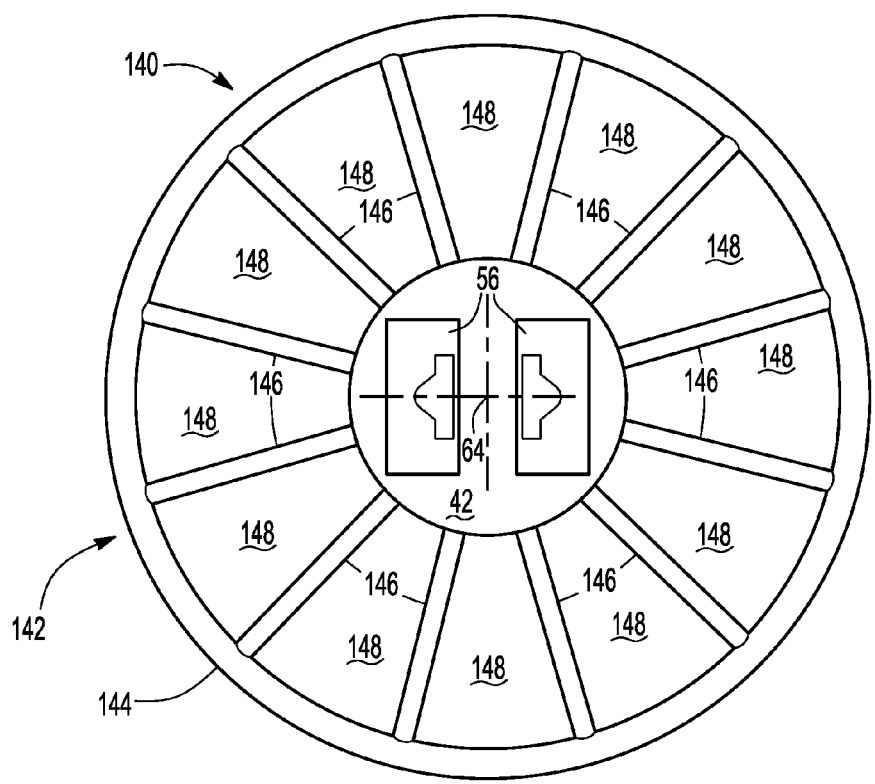

Referring to FIG. 9, a sixth embodiment of a retention clip 140 is shown. The retention clip 140 may include a pad 42 having first and second retention features 56 as previously described. In addition, the retention clip 140 may include a footing 142 that may include a ring member 144 and a set of arms 146. The ring member 144 may be spaced apart from the pad 42 and may extend completely around the pad 42. In the embodiment shown, the ring member 144 is circular and is radially disposed about or with respect to the center 64 of the pad 42. As such, the ring member 144 and pad 42 may be concentrically disposed in one or more embodiments. The arms 146 may extend from the pad 42 to the ring member 144. The arms 146 may be spaced apart from each other and may extend radially with respect to the center 64 of the pad 42. The pad 42 may cooperate with the ring member 144 and members of the set of arms 146 to define a plurality of footing openings 148.

Referring to FIG. 10, a seventh embodiment of a retention clip 150 is shown. This embodiment is similar to the embodiment shown in FIG. 9 and includes a pad 42 having first and second retention features 56 and a footing 152 that may include a ring member 154 and a set of arms 156. The ring member 154 may be spaced apart from the pad 42 and may extend completely around the pad 42. In this embodiment, the ring member 154 is oval-shaped and has a first curved segment 160, a second curved segment 162, a first connecting segment 164, and a second connecting segment 166. The first curved segment 160 may have a first end 170 and a second end 172 disposed opposite the first end 170. Similarly, the second curved segment 162 may have a first end 174 and a second end 176 disposed opposite the first end 174. The first connecting segment 164 may extend from the first end 170 of the first curved segment 160 to the first end 174 of the second curved segment 162. The second connecting segment 166 may extend from the second end 172 of the first curved segment 160 to the second end 176 of the second curved segment 162. The arms 156 may extend from the pad 42 to the ring member 154. In addition, the arms 156 may extend radially and may be spaced apart from each other as previously discussed.

Referring to FIG. 11, an eighth embodiment of a retention clip 180 is shown. In this embodiment, the retention clip 180 may include a pad 42 having first and second retention features 56 and a footing 182. The footing 182 may include a ring member 184 and a set of arms 186. The ring member may include a set of curved segments 188. Each member of the set of curved segments 188 may engage two other curved segments 188. For example, a first curved segment 188 may have a first end and a second end disposed opposite the first end. The first end may engage the second end of another curved segment 188, such as a second curved segment. The second end may engage the first end of a different curved segment 188, such as a third curved segment. In at least one embodiment, each curved segment 188 may be generally concave with respect to the pad 42 or in a direction extending toward the pad 42. Each member of the set of arms 186 may extend from the pad 42 to the ring member 184. In at least one embodiment, each arm 186 may extend radially and may engage the ring member 184 where two curved segments 188 intersect.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat trim retention clip comprising:
    a pad having first and second retention features configured to engage a trim cover assembly;
    first and second footings that are spaced apart from each other, wherein the first and second footings each include:
        first and second arms that extend from the pad, and
        an arcuate arm that is spaced apart from the pad and extends along an arc from an end of the first arm to an end of the second arm; and
    a ring member that is spaced apart from the pad and extends completely around the pad, wherein the ring member intersects the first and second footings such that the ring member is disposed closer to the pad than the arcuate arm and is coplanar with the arcuate arm.

2. The seat trim retention clip of claim 1 wherein the ring member intersects the first and second arms of the first footing and the first and second arms of the second footing.

3. The seat trim retention clip of claim 1 wherein the ring member is circular and is radially disposed with respect to a center of the pad.

4. The seat trim retention clip of claim 1 further comprising first and second axial arms that are coaxially disposed and extend in opposite directions from the pad, wherein the first axial arm intersects the ring member and the arcuate arm of the first footing and the second axial arm intersects the ring member and the arcuate arm of the second footing.

5. The seat trim retention clip of claim 4 wherein the first axial arm bisects the arcuate arm of the first footing and the second axial arm bisects the arcuate arm of the second footing.

6. The seat trim retention clip of claim 4 further comprising a first curved arm that has first and second curved arm ends that are disposed opposite each other, wherein the first and second curved arm ends of the first curved arm intersect the arcuate arm of the first footing and wherein the first curved arm intersects the ring member between the first and second curved arm ends.

7. The seat trim retention clip of claim 6 further comprising a second curved arm that has first and second curved arm ends that are disposed opposite each other, wherein the first and second curved arm ends of the second curved arm intersect the arcuate arm of the second footing and wherein the second curved arm intersects the ring member between the first and second curved arm ends of the second curved arm.

8. The seat trim retention clip of claim 7
    wherein the first axial arm intersects the ring member, the first curved arm, and the arcuate arm of the first footing; and
    wherein the second axial arm intersects the ring member, the second curved arm, and the arcuate arm of the second footing.

9. The seat trim retention clip of claim 8 wherein the first curved arm is radially disposed about an intersection of the first axial arm and the arcuate arm of the first footing and wherein the second curved arm is radially disposed about an intersection of the second axial arm and the arcuate arm of the second footing.

10. The seat trim retention clip of claim 1 wherein the ring member intersects the first footing at the end of the first arm of the first footing and at the end of the second arm of the first footing.

11. The seat trim retention clip of claim 1 wherein the ring member intersects the second footing at the end of the first arm of the second footing and at the end of the second arm of the second footing.

* * * * *